US011720440B2

(12) United States Patent
Cherukuri et al.

(10) Patent No.: US 11,720,440 B2
(45) Date of Patent: Aug. 8, 2023

(54) ERROR CONTAINMENT FOR ENABLING LOCAL CHECKPOINT AND RECOVERY

(71) Applicant: NVIDIA CORPORATION, Santa Clara, CA (US)

(72) Inventors: Naveen Cherukuri, San Jose, CA (US); Saurabh Hukerikar, Santa Clara, CA (US); Paul Racunas, Landaff, NH (US); Nirmal Raj Saxena, Los Altos Hills, CA (US); David Charles Patrick, Madison, AL (US); Yiyang Feng, San Jose, CA (US); Abhijeet Ghadge, San Jose, CA (US); Steven James Heinrich, Madison, AL (US); Adam Hendrickson, San Jose, CA (US); Gentaro Hirota, Sunnyvale, CA (US); Praveen Joginipally, San Jose, CA (US); Vaishali Kulkarni, Sunnyvale, CA (US); Peter C. Mills, San Jose, CA (US); Sandeep Navada, San Jose, CA (US); Manan Patel, San Jose, CA (US); Liang Yin, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 33 days.

(21) Appl. No.: 17/373,678

(22) Filed: Jul. 12, 2021

(65) Prior Publication Data

US 2023/0011863 A1 Jan. 12, 2023

(51) Int. Cl.
G06F 11/07 (2006.01)
G06F 11/10 (2006.01)
(Continued)

(52) U.S. Cl.
CPC ...... *G06F 11/1016* (2013.01); *G06F 11/0772* (2013.01); *G06F 11/0793* (2013.01);
(Continued)

(58) Field of Classification Search
CPC ............ G06F 11/1016; G06F 11/0772; G06F 11/0793; G06F 11/1407; G06F 12/1018; G06F 12/1027
(Continued)

(56) References Cited

U.S. PATENT DOCUMENTS 6,263,452 B1 * 7/2001 Jewett ................. G06F 1/12
714/E11.138
6,530,036 B1 * 3/2003 Frey, Jr. .............. G06F 11/1084
714/764
(Continued)

FOREIGN PATENT DOCUMENTS

WO WO-2015012960 A1 * 1/2015 .......... G06F 12/0811

OTHER PUBLICATIONS

Nukada et al., "NVCR: A Transparent Checkpoint-Restart Library for NVIDIA CUDA", 2011 IEEE International Parallel & Distributed Processing Symposium, 10 pages.

*Primary Examiner* — Albert Decady
*Assistant Examiner* — Enam Ahmed
(74) *Attorney, Agent, or Firm* — Artegis Law Group, LLP

(57) ABSTRACT

Various embodiments include a parallel processing computer system that detects memory errors as a memory client loads data from memory and disables the memory client from storing data to memory, thereby reducing the likelihood that the memory error propagates to other memory clients. The memory client initiates a stall sequence, while other memory clients continue to execute instructions and the memory continues to service memory load and store operations. When a memory error is detected, a specific bit
(Continued)

pattern is stored in conjunction with the data associated with the memory error. When the data is copied from one memory to another memory, the specific bit pattern is also copied, in order to identify the data as having a memory error.

19 Claims, 7 Drawing Sheets

(51) Int. Cl.
    *G06F 12/1018*     (2016.01)
    *G06F 11/14*     (2006.01)
    *G06F 12/1027*     (2016.01)

(52) U.S. Cl.
    CPC ...... *G06F 11/1407* (2013.01); *G06F 12/1018* (2013.01); *G06F 12/1027* (2013.01)

(58) Field of Classification Search
    USPC .......................................................... 714/764
    See application file for complete search history.

(56) References Cited

U.S. PATENT DOCUMENTS

| | | | | |
|---|---|---|---|---|
| 6,848,063 | B2 * | 1/2005 | Rodeheffer | G06F 11/106 |
| | | | | 714/764 |
| 7,540,026 | B1 * | 5/2009 | Szor | G06F 12/1425 |
| | | | | 714/48 |
| 7,676,728 | B2 * | 3/2010 | Resnick | G11C 29/848 |
| | | | | 714/764 |
| 2013/0124838 | A1 | 5/2013 | Shah et al. | |
| 2019/0146874 | A1 * | 5/2019 | Gschwind | G11C 29/52 |
| | | | | 714/764 |
| 2021/0142438 | A1 * | 5/2021 | Appu | G06T 1/60 |

\* cited by examiner

ERROR CONTAINMENT FOR ENABLING LOCAL CHECKPOINT AND RECOVERY

GOVERNMENTAL RIGHTS

This invention was made with Government support under DOE Contract No. DE-AC52-07NA27344 and Lawrence Livermore National Laboratory Subcontract No. B620719. The Government has certain rights in this invention.

BACKGROUND

Field of the Various Embodiments

Various embodiments relate generally to parallel processing compute architectures and, more specifically, to error containment for enabling local checkpoint and recovery.

Description of the Related Art

High performance computing (HPC) systems are large computer systems that include hundreds or thousands of networked compute nodes, referred to herein as operating system (OS) nodes. Each OS node generally includes, among other things, one or more processing units, such as central processing units (CPUs) and/or graphics processing units (GPUs), and one or more memory systems. Such an HPC system, with a large quantity of networked OS nodes, may be deployed to process large amounts of data and perform complex calculations at speeds that are unachievable by a single OS node.

One limitation of large HPC systems is that such systems are susceptible to certain transient hardware errors that result in a corruption of data stored in the memory systems of one or more OS nodes. These transient hardware errors are referred to herein as memory errors. One such type of memory error occurs when a particle strikes a memory cell, thereby changing the value of the memory cell from 0 to 1 or from 1 to 0. This may result from high energy proton and/or neutron strikes due to cosmic radiation, thermal neutrons, alpha particle strikes, and/or the like. This type of soft error persists until a different value is stored in the memory cell. An OS node that loads corrupt data from a memory location may perform computations using the corrupt data or may execute the corrupt data as an instruction, which may silently corrupt other memory locations, i.e., such corruption may not be detectable. In addition, if the OS node exchanges data with other OS nodes in the HPC system, other OS nodes may likewise be corrupted.

One approach for recovering from memory errors is for either application software or system software to periodically take a snapshot of the system state, the OS node state, and/or the application state across all OS nodes in the HPC system and store the snapshot in a file system. This snapshot is referred to herein as a global checkpoint. When one of the OS nodes detects a memory error, all OS nodes are halted, the most recent global checkpoint is loaded to the OS nodes, and the OS nodes resume execution from the last global checkpoint. One drawback with this approach for global checkpoint storage and recovery is that, as the number and size of the OS nodes increase, the mean time between failures decreases, while the amount of time needed to store the global checkpoint increases. Consequently, as HPC system size increases, more time and processing power is consumed storing global checkpoints, and little forward progress is made executing the application software before a memory error occurs, resulting in a restore of the most recent global checkpoint.

An improvement to global checkpoint and recovery is to augment global checkpoint and recovery with local checkpoint and recovery. With local checkpoint and recovery, a separate local snapshot of the state for each OS node, or portion thereof, in the HPC system and the snapshots are stored in a file system. This snapshot is referred to herein as a local checkpoint. When one of the OS nodes detects a memory error, only the affected OS node is halted, the most recent local checkpoint is loaded to the OS node, and the OS node resumes execution from the last local checkpoint. Storing and loading a local checkpoint typically improves system throughput and helps with forward progress of the application software, relative to global checkpoint and recovery approaches. Software errors that cannot be resolved via local checkpoint and recovery may still be resolved via global checkpoint and recovery.

In one example, the performance cost of an error could be one hour of throughput loss per node in an HPC system that includes 1000 nodes and has a mean time between failure (MTBF) of 1000 hours per node. In such an HPC system, each node, on average, is expected to experience one error every 1000 hours. The HPC system is tasked with an application software program, where the entire job executes for 10,000 hours. In the case of global checkpoint and recovery, a failure in any node causes the global checkpoint to be restored. Given an MTBF of 1000 hours per node and an HPC system that includes 1000 nodes, the HPC experiences an average of one error per hour. Therefore, with the passing of each hour, the nodes restore to the global checkpoint and lose one hour of work. Even if only one node experiences an error, all nodes are penalized. At worst, the HPC system makes no forward progress, because the application software program executes for one hour, one or more nodes experiences an error, and all nodes return to the last global checkpoint representing the beginning of the application software program. By contrast, with local checkpointing, each node, on average, experiences 10 errors over the execution time of the job, given 10,000 hours of execution time and an MTBF of 1000 hours. As a result, each node independently experiences 10 hours of lost throughput, for a total of 10,010 hours of execution time for each node.

One drawback with this approach for local checkpoint storage and recovery is that local checkpoint and recovery techniques for a GPU typically store and restore checkpoints using code executing on the CPU. As a result, checkpoints are captured and stored between GPU kernel launches, where a kernel could execute for many hours. Local checkpoint recovery on the CPU limits the CPU to check for errors after kernel completes execution on the GPU. Local checkpoint and recovery may be performed per N kernels, where N may be any number greater than or equal to 1). If any error is detected, the affected kernel is restored locally. Other CPUs and GPUs in the system are not impacted. However, during execution of the affected kernel, the GPU may have corrupted state from the time the error occurred to the time local checkpoint is restored. Further, corruption of a kernel executing on one GPU may negatively impact other GPUs, such as when a GPU executing a corrupt kernel communicates with other GPUs.

One way to avoid inter-GPU corruption is to build a system where GPUs communicate via CPU instead of directly talking to each other. However, this approach limits a key advantage of HPC systems because GPU to GPU communications typically have a higher bandwidth relative to GPU to CPU communications. Further, if the GPU does not have error containment capability, a GPU may corrupt the CPU state without detection, such as a GPU that uses corrupt data to update memory used by CPU. With no error containment on the GPU, local checkpoint and recovery is not guaranteed to produce correct results. Given these limitations of local checkpoint and recovery, maintaining integrity of CPU-GPU sharing or inter-GPU sharing typically requires either employing global checkpoint and recovery, resulting in less throughput or no forward progress, or building smaller, less performant HPC systems with a longer MTBF.

As the foregoing illustrates, what is needed in the art are more effective techniques for recovering from memory failures in large computing systems.

SUMMARY

Various embodiments of the present disclosure set forth a computer-implemented method for processing a memory error. The method includes causing a first instruction that includes a first memory load operation to be executed by a first memory client included in a plurality of memory clients. The method further includes receiving an indication that data associated with the memory load operation is corrupt. The method further includes in response to receiving the indication: (1) disabling the first memory client from performing memory store operations, and (2) initiating one or more stall operations for the first memory client. Further, a second memory client included in the plurality of memory clients continues to execute instructions while the first memory client is disabled.

Other embodiments include, without limitation, a system that implements one or more aspects of the disclosed techniques, and one or more computer readable media including instructions for performing one or more aspects of the disclosed techniques, as well as a method for performing one or more aspects of the disclosed techniques.

At least one technical advantage of the disclosed techniques relative to the prior art is that, with the disclosed techniques, local checkpoint and recovery is performed with finer granularity relative to prior approaches. When a memory client within a GPU detects a memory error, only the affected memory client is halted, the most recent local checkpoint is loaded to the memory client, and the memory client resumes execution from the last local checkpoint. Further, local checkpoint and recovery is performed by the GPU and for each memory client, resulting in faster detection of memory errors that occur during execution of the GPU program. Another technical advantage of the disclosed techniques is that, when a memory client within the GPU detects a memory error, the memory client is prevented from storing or otherwise transmitting data outward to other memory locations, other memory clients in the GPU, other GPUs, or the CPU. As a result, the chance of a memory occurring in one GPU propagating to other parts of the OS node or to other OS nodes is reduced relative to prior approaches. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

As described herein, a GPU performs fine-grain local checkpoint and recovery at instruction boundaries of memory clients within the GPU. As a result, the described techniques store microarchitecture state at finer boundaries relative to former techniques that perform checkpoint and recovery of the application state at kernel or function boundaries. As defined herein, a memory client includes any component that executes instructions and/or performs other operations that load data from memory and/or store data to memory. A software recovery driver periodically stores the microarchitecture state as local checkpoints for the memory clients in the GPU. More specifically, the software recovery driver leverages the Compute Instruction Level Preemption (CILP) feature of the GPU to stall execution at a GPU program instruction boundary. When the memory clients within the GPU have stalled, the software recovery driver stores a checkpoint that includes the microarchitecture state of the memory clients. As further described herein, a memory client includes any system component that performs memory load operations and/or memory store operations to any memory. Memory clients include, without limitation, streaming multiprocessors (SMs), global constant caches (GCCs), copy engines 434, context switchers, and/or the like. When a memory client detects a memory error, the memory client prevents further data from being stored or transmitted by the memory client to the memory system, thereby preventing the memory error from propagating to other memory clients, to other GPUs, or to the CPU. The memory client also blocks context switches and memory barriers to contain the memory error. The memory client initiates one or more stall operations to drain instructions from any instruction queues in the memory client, in order to flush any pending memory operations. As a result, the memory client preserves the integrity of the previous local checkpoint, thereby enabling the software recovery driver to reliably restart from the previous local checkpoint. The memory client stores error log data that includes data associated with the memory error, notifies the software recovery driver and stalls. The software recovery driver then accesses the error log data to determine the nature of the memory error, restores the previous local checkpoint, and restarts the stalled memory client.

System Overview

Figure 1:
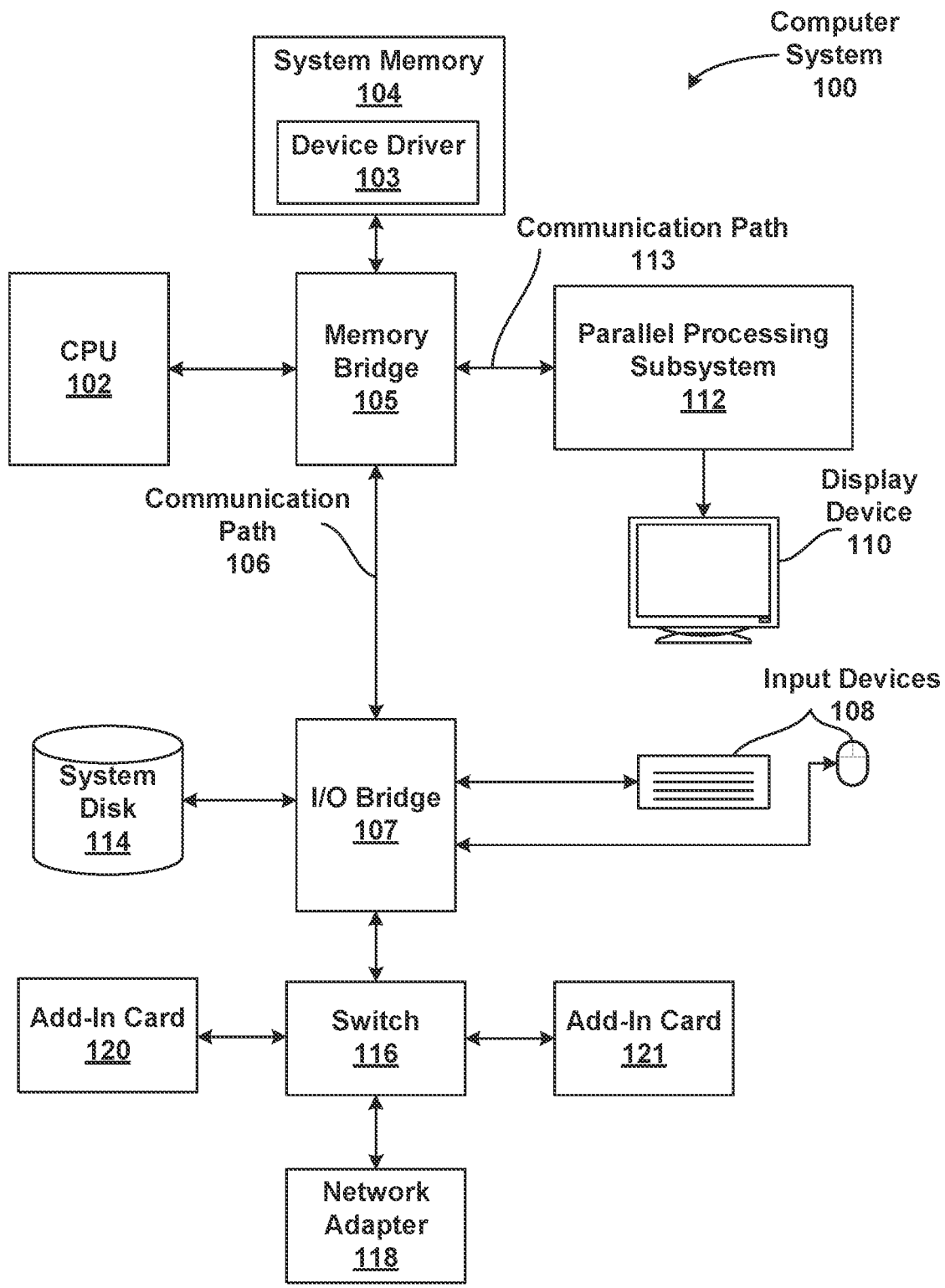
FIG. 1 is a block diagram of a computer system configured to implement one or more aspects of the various embodiments.

FIG. 1 is a block diagram of a computer system 100 configured to implement one or more aspects of the various embodiments. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
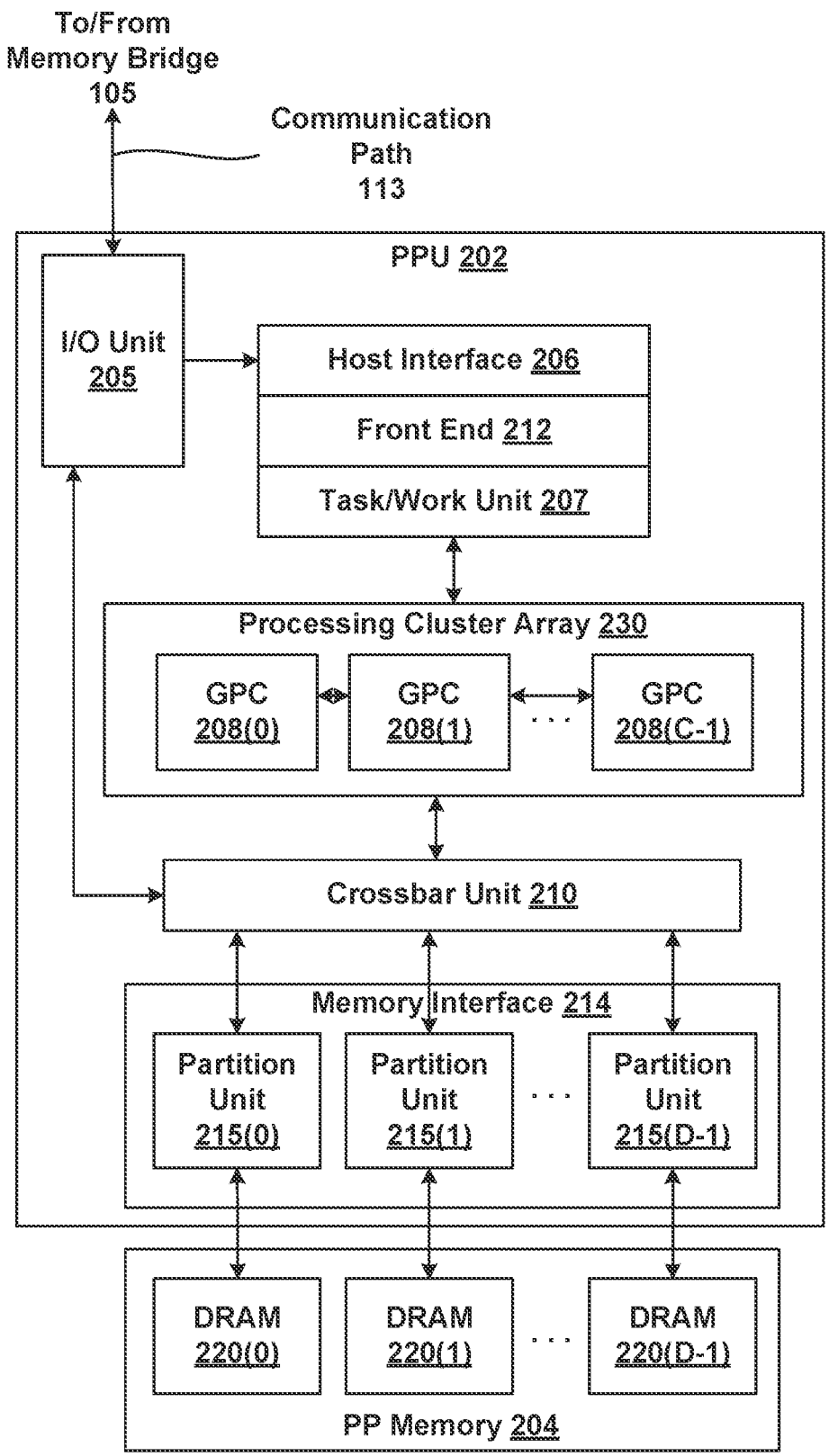
FIG. 2 is a block diagram of a parallel processing unit (PPU) included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113, and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PP memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215. In various embodiments, crossbar unit 210 may be replaced or enhanced by any network topology including, without limitation, an on-chip network.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity, and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
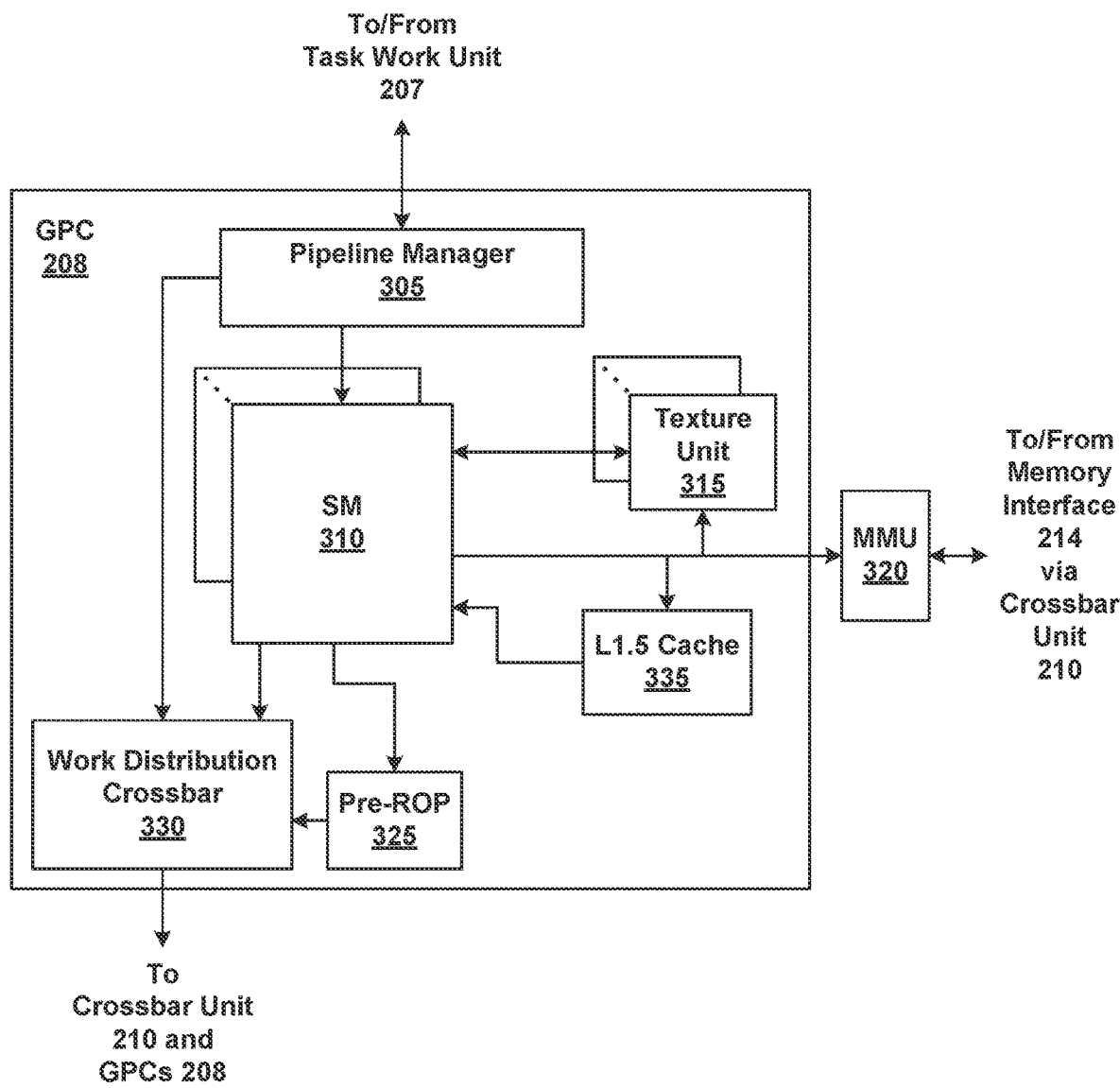
FIG. 3 is a block diagram of a general processing cluster (GPC) included in the parallel processing unit (PPU) of FIG. 2, according to various embodiments.

FIG. 3 is a block diagram of a general processing cluster (GPC) 208 included in the parallel processing unit (PPU) 202 of FIG. 2, according to various embodiments. In operation, GPC 208 may be configured to execute a large number of threads in parallel to perform graphics, general processing and/or compute operations. As used herein, a "thread" refers to an instance of a particular program executing on a particular set of input data. In some embodiments, single instruction multiple data (SIMD) instruction issue techniques are used to support parallel execution of a large number of threads without providing multiple independent instruction units. In other embodiments, single instruction multiple thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution units may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In various embodiments, a software application written in the compute unified device architecture (CUDA) programming language describes the behavior and operation of threads executing on GPC 208, including any of the above-described behaviors and operations. A given processing task may be specified in a CUDA program such that the SM 310 may be configured to perform and/or manage general-purpose compute operations.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (pre-ROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or pre-ROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the various embodiments of the present disclosure.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Fine-Grained Local Checkpoint and Recovery

As described herein, the PPU 202 performs fine-grain local checkpoint and recovery at instruction-level boundaries of memory clients within the PPU 202. As further described herein, a memory client is any system component that performs memory load operations and/or store operations to any memory. Memory clients include, without limitation, streaming multiprocessors (SMs), global constant caches (GCCs), copy engines 434, context switchers, and/or the like. A software recovery driver periodically stores local checkpoints for the memory clients in the PPU 202. The software recovery driver may be included in the device driver 103, in a separate CUDA driver, and/or the like. The software recovery driver leverages the Compute Instruction Level Preemption (CILP) feature of the PPU 202 to stall execution at a PPU 202 program instruction boundary. When the memory clients within the PPU 202 have stalled, the software recovery driver stores a checkpoint that includes the microarchitecture state of the memory clients. When a memory client detects a memory error, the memory client prevents further data from being stored or transmitted by the memory client to the memory system, thereby preventing the memory error from propagating to other memory clients, to other PPUs 202, or to the CPU 102. The memory client also blocks context switches and memory barriers to contain the memory error. The memory client initiates one or more stall operations to drain instructions from any instruction queues in the memory client, in order to flush any pending memory operations. As a result, the memory client preserves the integrity of the previous local checkpoint, thereby enabling the software recovery driver to reliably restart from previous local checkpoint. The memory client stores error log data that includes data associated with the memory error, notifies the software recovery driver and stalls. The software recovery driver then accesses the error log data to determine the nature of the memory error, restores the previous local checkpoint, and restarts the stalled memory client.

Figure 4:
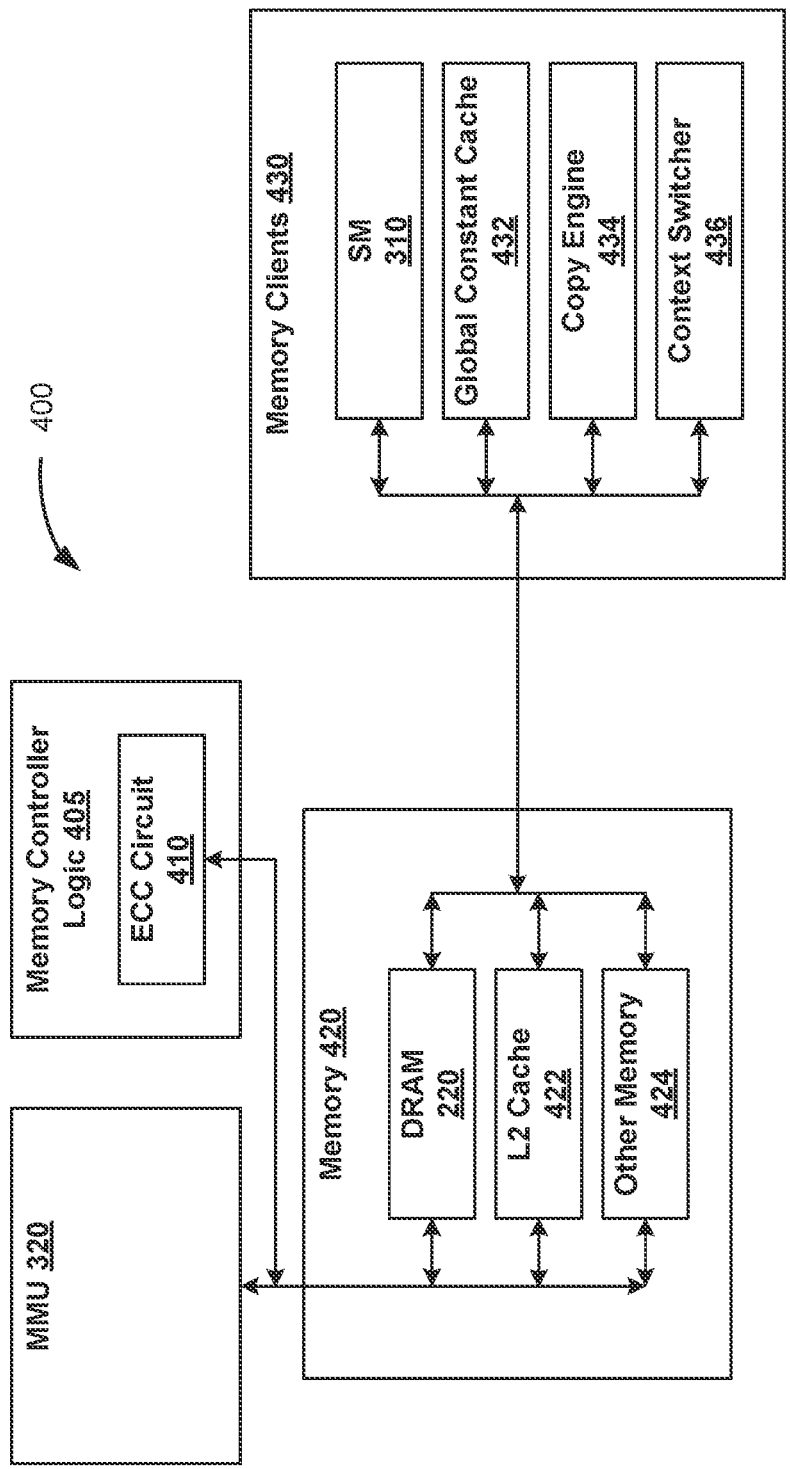
FIG. 4 is a block diagram of the memory access system included in the PPU and GPC of FIG. 2, according to various embodiments.

FIG. 4 is a block diagram of the memory access system 400 included in the PPU 202 and GPC 208 of FIG. 2, according to various embodiments. As shown, the memory access system 400 includes, without limitation, the MMU 320, memory controller logic 405, memory 420 and memory clients 430. The memory controller logic 405 includes, without limitation, an ECC circuit 410. The ECC circuit 410 is representative of any one or more ECC circuits and/or ECC protection logic embedded in or in support of the MMU 320 and/or any memory 420, including DRAM 220, L2 cache, other memory 424, and/or the like. The memory 420 includes, without limitation, DRAM 220, a level 2 (L2) cache 422, and other memory 424. The memory clients 430 include, without limitation, an SM 310, a global constant cache (GCC) 432, a copy engine 434, and a context switcher 436.

In some embodiments, the memory access system 400 may include multiple instances of the memory controller logic 405, where each instance of the memory controller logic 405 may include a separate ECC circuit 410. In such embodiments, one instance of the memory controller logic 405 may control the DRAM 220. Multiple instances of the memory controller logic 405 may control the various cache memories in the cache hierarchy, where a first instance may control the L2 cache 422, a second instance may control an L1.5 cache, a third instance may control an L1 cache, and so on. Similarly, Multiple instances of the memory controller logic 405 may control the other memory 424, where each first instance may control a different memory included in the other memory 424.

As described herein, DRAM 220 resides within PP memory 204. In addition to data bits, the DRAM 220 includes error correction code (ECC) bits. When a memory client 430 loads data from the DRAM 220, the ECC circuit 410 associated with the DRAM 220 processes the data bits and ECC bits in order to detect and/or correct memory errors. In a typical ECC implementation, the ECC circuit 410 is able to correct one-bit errors and detect two-bit errors. More sophisticated ECC circuits 410 are able to correct two or more bit errors and/or detect three or more bit errors. In general, when the ECC circuit 410 detects a correctable ECC error, the ECC circuit 410 may correct the ECC error and without notifying other system components about the ECC error. Therefore, if a memory client 430 loads data from the DRAM 220, the ECC circuit 410 determines that the data has no errors or has a correctible error, then the DRAM 220 returns the data to the requesting memory client 430 along with an indicator signal that identifies the data as not corrupt. In some embodiments, the signal may be in the form of a wire connection that has a first voltage level if the data is not corrupt (indicating valid data) or a second voltage level if the data is corrupt (indicating poisoned data). If, however, the ECC circuit 410 determines that the data has an uncorrectable ECC error, the DRAM 220 returns the data to the requesting memory client 430 along with an indicator signal that identifies the data as corrupt by returning a "poison pattern," signaling a halt condition. In addition, an incoming memory store operation results in storing the poison pattern in DRAM 220. The data bits representing the data and/or the poison pattern is referred to herein as a "memory word." For example, an L2 cache 422 eviction of a cache line that has an ECC error and/or a poison pattern results in storing the poison pattern to DRAM 220 to indicate that the evicted cache line is corrupt. If another memory client 430 subsequently loads the same data from memory, then the ECC 410 circuit detects that the data is stored with the poison pattern. As a result, the DRAM 220 returns the data to the requesting memory client 430 along with an indicator signal that identifies the data as corrupt, signaling a halt condition. Further, when data is accessed from the DRAM 220, the data is also stored in the L2 cache 422, including the data poison bits. In this manner, a memory client 430 that accesses the same data receives an indicator signal that identifies the data as corrupt whether the data is received from the DRAM 220 or the L2 cache 422.

Memory clients 430 also have access to the L2 cache 422, where the L2 cache 422 may be used to transfer data between threads. In addition to data bits, the L2 cache 422 includes ECC bits and data poison bits. In some embodiments, the data poison bits may be an extension of the cache tag bits. When a memory client 430 loads data from the L2 cache 422, the ECC circuit 410 associated with the L2 cache 422 processes the data bits and ECC bits in order to detect and/or correct memory errors. In a typical ECC implementation, the ECC circuit 410 is able to correct one-bit errors and detect two-bit errors. More sophisticated ECC circuits 410 are able to correct two or more bit errors and/or detect three or more bit errors. If, when a memory client 430 loads data from the L2 cache 422, the ECC circuit 410 determines that the data has no errors or has a correctible ECC error, the L2 cache 422 returns the data to the requesting memory client 430 along with an indicator signal that identifies the data as not corrupt. If, however, the ECC circuit 410 determines that the data has an uncorrectable ECC error, the L2 cache 422 returns the data to the requesting memory client 430 along with an indicator signal that identifies the data as corrupt by returning a "poison pattern," signaling a halt condition. In addition, an incoming memory store operation results in storing the poison pattern in DRAM 220. For example, an L2 cache 422 eviction of a cache line that has an ECC error and/or a poison pattern results in storing the poison pattern to DRAM to indicate that the evicted cache line is corrupt. If another memory client 430 subsequently loads the same data from memory, then the ECC circuit 410 detects that the data is stored with the poison pattern. As a result, the DRAM 220 returns the data to the requesting memory client 430 along with an indicator signal that identifies the data as corrupt, signaling a halt condition. Further, when data is evicted from the L2 cache 422 and transferred to the DRAM 220, the data is stored in the DRAM 220 along with the data poison bits. In this manner, a memory client 430 that accesses the same data receives an indicator signal that identifies the data as corrupt whether the data is received from the DRAM 220 or the L2 cache 422.

Further, when data from a cache line in the L2 cache 422 is stored to the DRAM 220, a data poison bit is set if either the cache line has a set poison bit and/or if the cache line has an ECC error. In either case, the DRAM 220 does not employ a separate data poison bit. Instead, the DRAM 220 stores the data using a poison pattern, indicating that the stored data is corrupt. The poison pattern stored in the DRAM 220 retains ECC properties without additional storage overhead for supporting poison indication. Therefore, any subsequent memory operation that occurs to the area in the DRAM 220 where the cache line was stored results in a detected error. This condition results from the memory controller logic 405 storing data in the DRAM 220 using the poison pattern. For example, data from the L2 cache 422 may be marked as corrupt when stored in the DRAM 220, and the same data incurs another ECC error in the DRAM 220. With the disclosed techniques, the data in the DRAM 220 still preserves the data poison bits. Therefore, whether or not the data from the L2 cache 422 stored the DRAM 220 is corrupt, subsequent errors in the DRAM 220 are detected. As a result, memory errors that occur in the L2 cache 422 are preserved in the DRAM 220, as well as subsequent errors that occur in the DRAM 220. In general, the poison pattern is a unique combination of ones and zeroes that identifies the corresponding data as poison. An ECC error in the poison pattern is treated as an uncorrectable error. In contrast to error correction for regular data, a single bit error in the poison pattern is not corrected. As a result, the poison pattern has the same corruption protection as the corresponding data. Advantageously, the poison pattern exhibits the same double bit error detectability property as regular data.

Other memory 424 includes any other technically feasible memory, such as may include any one or more technically feasible memories, including, without limitation, static random access memories (SRAMs), an L1 cache, an L1.5 cache, and/or the like. These other memories 424 function substantially the same as the DRAM 220 and the L2 cache 422, as described herein. Therefore, the techniques disclosed herein may be applied to any one or more of the memories included in the other memory 424.

In some embodiments, the MMU 320 does not return a poison pattern, because the memory data in the MMU 320 is read-only data. Instead, when the MMU 320 detects an error, the MMU 320 invalidates the affected data within the MMU 320 and fetches new data from DRAM 220. However, if the DRAM 220 returns data with a poison pattern to the MMU 320, the MMU 320 transmits an MMU negative acknowledge (MMU_NACK) to the requesting memory client 430, to identify to the requesting memory client 430 that the data within the MMU 320 is corrupt.

When a memory error occurs, the requesting memory client 430 stalls, but the MMU 320, the memory 420 and other shared resources do not stall. Instead, because the MMU 320 and the memory 420 are shared resources, the MMU 320 and the memory 420 continue to service memory load and store operations from other memory clients 430. In this manner, the memory clients 430 that have not stalled continue to execute and continue to perform load and store operations to the memory 420, so long as the memory clients 430 do not attempt a load operation that results in a memory error. As a result, the only memory clients 430 that stall are those memory clients 430 that encounter a memory error. In this manner, an error detected by one memory client 430 does not impact execution of other memory clients 430.

As described herein, the SM 310 includes a set of functional execution units, such as execution units and load-store units. In operation, the SM 310 loads data from one or more of the DRAM 220, the L2 cache 422, and other memory 424. During a memory load operation from the DRAM 220, the L2 cache 422, or other memory 424, the SM 310 receives the data along with an indicator signal that identifies whether the data is corrupt. If the indicator signal identifies the data as not corrupt, then the SM 310 completes the memory load operation and continues execution. If, however, the indicator signal identifies the data as corrupt, then the SM 310 disables stores to memory, stores to file systems, and other data transmission from the SM 310 to prevent the corrupt data from affecting other memory 420 locations, memory clients 430, and/or other components of the PPU 202.

The SM 310 initiates one or more stall operations to disable further memory load operations and/or memory store operations, including memory barriers, and context switches. At the time that the SM 310 initiates the stall sequence, multiple memory load and/or store operations may be pending in the pipeline of the SM 310. If the memory load and/or store operations remain in the pipeline, then the memory load and/or store operations improperly execute before the SM 310 resumes execution at a prior checkpoint. To prevent the memory load and/or store operations from executing, the SM 310 drains and discards any pending memory load and/or store operations in the pipeline.

As part of the stall sequence, the SM 310 generates and stores error log data that indicates the SM 310 stalled because of a memory error, the location of the memory error, the instruction executing at the time of the memory error, the context and/or process that was executing on the SM 310 at the time of the memory error, the SM 310 that detected the memory error, and/or the like. In some embodiments, the memory error may be context attributable. For example, certain memory errors, such as errors internal to an SM 310, may be attributable to the instruction boundary. Other memory errors, such as poison indications returned from the L2 cache 422 and/or DRAM 220 to the SM 310, may not be attributable to an instruction boundary. The software recovery driver resets the engine and analyzes the error log data. The software recovery driver restores the most recent local checkpoint to the SM 310. Depending on the process and/or context executing at the time of the memory error, the software recovery driver may also restore one or more other memory clients 430 to the most recent local checkpoint. The software recovery driver causes the SM 310 and other affected memory clients 430 to resume operation beginning at the restored checkpoint.

In some embodiments, the SM 310 may include internal memory, such as register files, an L1 cache, and/or the like. This internal memory may also include ECC bits and data poison bits. As a result, when the SM 310 accesses internal memory, the SM 310 may determine that data in the internal memory is corrupt. If the SM 310 determines that data in the internal memory is corrupt, then the SM 310 can perform the same techniques as described herein in conjunction with the DRAM 220, the L2 cache 422, and other memory 424.

In operation, the global constant cache (GCC) 432, also referred to herein as a constant cache memory, retrieves data loads data from one or more of the DRAM 220, the L2 cache 422, and other memory 424 and stores the data in the GCC 432. The GCC 432 stores data such as constant values, executable instructions, and any other data, that is readable, but not writeable, by the SM 310 and, optionally, other memory clients 430. In this manner, the GCC 432 presents as a read-only memory to the other memory clients 430. In operation, the GCC 432 loads data from one or more of the DRAM 220, the L2 cache 422, and other memory 424. During a memory load operation from the DRAM 220, the L2 cache 422, or other memory 424, the GCC 432 receives the data along with an indicator signal that identifies whether the data is corrupt. If the indicator signal identifies the data as not corrupt, then the GCC 432 completes the memory load operation and continues execution. If, however, the indicator signal identifies the data as corrupt, then the GCC 432 disables stores to memory, stores to file systems, and other data transmission from the GCC 432 to prevent the corrupt data from affecting other memory 420 locations, memory clients 430, and/or other components of the PPU 202.

The GCC 432 initiates one or more stall operations to disable further memory load operations and/or memory store operations, including memory barriers, and context switches. As part of the stall sequence, the GCC 432 generates and stores error log data that indicates the GCC 432 stalled because of a memory error, the location of the memory error, the instruction executing at the time of the memory error, the context and/or process that was executing on the SM 310 at the time of the memory error, the GCC 432 that detected the memory error, and/or the like. The software recovery driver resets the engine and analyzes the error log data. The software recovery driver restores the most recent local checkpoint to the GCC 432. Depending on the process and/or context executing at the time of the memory error, the software recovery driver may also restore one or more other memory clients 430 to the most recent local checkpoint. The software recovery driver causes the GCC 432 and other affected memory clients 430 to resume operation beginning at the restored checkpoint.

In some embodiments, the GCC 432 may include internal memory, such as register files, an L1 cache, and/or the like. This internal memory may also include ECC bits and data poison bits. As a result, when the GCC 432 accesses internal memory, the GCC 432 may determine that data in the internal memory is corrupt. If the GCC 432 determines that data in the internal memory is corrupt, then the GCC 432 can perform the same techniques as described herein in conjunction with the DRAM 220, the L2 cache 422, and other memory 424.

In operation, the copy engine 434 executes block copy operations of data in the form of direct memory access (DMA) operations. The copy engine 434 loads data from a source location in the memory 420 and stores the data at a corresponding destination location in the memory 420. During a memory load operation from the memory 420, the copy engine 434 receives the data along with an indicator signal that identifies whether the data is corrupt. If the indicator signal identifies the data as not corrupt, then the copy engine 434 completes the memory load operation and continues the block copy operation. If, however, the indicator signal identifies the data as corrupt, then the copy engine 434 disables stores to memory, stores to file systems, and other data transmission from the copy engine 434 to prevent the corrupt data from affecting other memory 420 locations, memory clients 430, and/or other components of the PPU 202.

The copy engine 434 initiates one or more stall operations to stop the block copy operation and disable further memory load operations and/or memory store operations. As part of the stall sequence, the copy engine 434 generates and stores error log data that indicates the copy engine 434 stalled because of a memory error, the location of the memory error, the instruction executing at the time of the memory error, the context and/or process that was executing on the copy engine 434 at the time of the memory error, the copy engine 434 that detected the memory error, and/or the like. The software recovery driver resets the engine and analyzes the error log data. The software recovery driver restores the most recent local checkpoint to the copy engine 434. Depending on the process and/or context executing at the time of the memory error, the software recovery driver may also restore one or more other memory clients 430 to the most recent local checkpoint. The software recovery driver causes the copy engine 434 and other affected memory clients 430 to resume operation beginning at the restored checkpoint.

In operation, the context switcher 436 supports time slicing of various contexts, where each context is a process or subprocess. In a time-sliced system, the SM 310 execute one context for a designated duration of time. At the expiration of the duration of time, the context switcher 436 stalls the SM 310 and saves the current context of the SM 310 to memory 420. The context switcher 436 restores a new context to the SM 310 from memory 420 and begins execution of the new context. In this manner, the SM 310 sequentially executes time slices of multiple contexts. When the context switcher 436 restores the new context, the data loaded from memory 420 may be corrupt.

During restore, the context switcher 436 performs memory load operations from the memory 420. The context switcher 436 receives the data along with an indicator signal that identifies whether the data is corrupt. If the indicator signal identifies the data as not corrupt, then the context switcher 436 completes the memory load operation and continues the restore. If, however, the indicator signal identifies the data as corrupt, then the context switcher 436 stops the restore and disables stores to memory, stores to file systems, and other data transmission from the context switcher 436 to prevent the corrupt data from affecting the corresponding SM 310, other memory 420 locations, memory clients 430, and/or other components of the PPU 202. The context switcher 436 maintains the corresponding SM 310 in a stalled state. In this manner, the context switcher 436 prevents the SM 310 from executing a corrupt context.

The context switcher 436 initiates one or more stall operations to stop the restore and disable further memory load operations and/or memory store operations. As part of the stall sequence, the context switcher 436 generates and stores error log data that indicates the context switcher 436 stalled because of a memory error, the location of the memory error, the instruction executing at the time of the memory error, the context and/or process that was executing on the context switcher 436 at the time of the memory error, the context switcher 436 that detected the memory error, and/or the like. The software recovery driver resets the engine and analyzes the error log data. The software recovery driver restores the most recent local checkpoint to the context switcher 436. Depending on the process and/or context executing at the time of the memory error, the software recovery driver may also restore one or more other memory clients 430 to the most recent local checkpoint. The software recovery driver causes the context switcher 436 and other affected memory clients 430 to resume operation beginning at the restored checkpoint.

The process for tracking memory errors varies based on whether the memory error originated in the DRAM 220 or the L2 cache 422. In a first example, a memory error originates in the DRAM 220. When a memory client 430 accesses data in the DRAM 220 that has a memory error, the ECC circuit 410 detects the memory error via the ECC bits. A memory controller, such as the memory controller logic 405, stores the data and the data poison bits from the DRAM 220 to an available cache line in the L2 cache 422. If a second memory client 430 subsequently accesses the same data, then the second memory client 430 loads the data from the cache line in the L2 cache 422. Because the cache line includes the poison pattern, the second memory client 430 receives an indication of the memory error, even though the memory error originated in the DRAM 220.

In a second example, a memory error originates in the L2 cache 422. When a memory client 430 accesses data in a cache line of the L2 cache 422 that has a memory error, the ECC circuit 410 detects the memory error via the ECC bits and stores the data poison bits with the poison pattern. Subsequently, when the cache line with the memory error is evicted from the L2 cache 422, a memory controller, such as the memory controller logic 405, stores the data and the data poison bits from the cache line in the L2 cache 422 to the appropriate place in the DRAM 220. If a memory client 430 later accesses the data from the DRAM 220, then then the memory client 430 loads the data from the DRAM 220. Because the memory in the DRAM includes the poison pattern, the memory client 430 receives an indication of the memory error, even though the memory error originated in the L2 cache 422.

During memory accesses, such as memory load and store operations, the role of the MMU 320 is to validate the memory access of a memory client 430 and to convert a virtual address sent by the memory client to a physical address used for accessing a memory location within the L2 cache 422 or the DRAM 220. Primarily, MMU 320 checks to determine whether the memory access is legal. If the memory access is illegal, then the MMU 320 returns a MMU negative acknowledge (MMU_NACK) to the requesting memory client 430 to identify the memory access as an illegal access. In some embodiments, the MMU 320 itself may be considered a memory client 430, because page tables and/or the like stored within the MMU 320 have backing store copies that are stored in the L2 cache 422 and/or DRAM 220. The MMU 320 includes one or more SRAM structures that store these page tables and/or the like. If the TLB in the MMU 320 does not have translation for a request memory access, the MMU 320 "walks" through the memory of the L2 cache 422 and/or DRAM 220 to fetch page tables in order to translate the virtual address sent by the memory client to a physical address.

In general, the MMU 320 may encounter two types of errors. In a first type of error, a TLB entry in the MMU 320 has a parity error or an ECC error. With this first type of error, the MMU 320 discards the TLB entry and performs a page walk, to reload the relevant page tables from the L2 cache 422 and/or DRAM 220. The MMU 320 recovers from this type of error without having to notify the memory client 430 because the TLB is considered to include read-only data. In a second type of error, when a page translation that is performed as part of page walk is returned by the L2 cache 422 and/or DRAM 220, the data associated with the page translation may be poisoned. With this second type of error, the MMU 320 returns a MMU negative acknowledge (MMU_NACK) to the requesting memory client 430, because the source of the read-only data itself is correct. Because, with this second type of error, the TLB entry in the MMU 320 does not have a poison pattern, a poisoned translation is not stored in the TLB.

It will be appreciated that the system shown herein is illustrative and that variations and modifications are possible. The MMU 320 is shown as a single memory management unit with a single ECC circuit 410. However, the disclosed techniques may be deployed via any number and/or instances of MMUs 320, memory controller logic 405, and ECC circuits 410, in any technically feasible combination. The memory 420 is shown with a single DRAM 220 and a single L2 cache 422. However, the disclosed techniques may be deployed via any number of DRAMs 220, L2 caches 422 and other memory 424, in any technically feasible combination. Likewise, the memory clients 430 are shown as a single SM 310, a single GCC 432, a single copy engine 434, and a single context switcher 436. However, the disclosed techniques may be deployed via any number of SMs 310, GCCs 432, copy engines, and context switchers 436, in any technically feasible combination.

In some embodiments, the disclosed techniques may be employed in a system with multiple PPUs 202, where corrupt data on a first PPU 202 is loaded by a second PPU 202. In addition, the disclosed techniques may be employed in a system with multiple PPUs 202 that communicate with each other over a network, so long as the network is configured to transfer the data poison bits and/or corrupt data indicator over the network. Further, the disclosed techniques may be employed in a system with a partitioned PPU 202, where a single PPU 202 is shared among two or more tenants, while providing correct context attribution and error isolation between tenants.

In one example, an SM 310 executing on a first PPU 202 accesses data from memory 420 on a second PPU 202. During the memory load performed on the second PPU 202, the second PPU 202 detects a memory error. The second PPU 202 transmits the data to the SM 310 on the first PPU 202 with an indicator that identifies the data as corrupt. The SM 310 initiates a stall sequence, as described herein, and identifies the context execution on the SM 310 in the first PPU 202 as the context that encountered the memory error. The SM 310 in the first PPU 202 identifies the second PPU 202 as the source of the memory error. No context on the second PPU 202 is stalled or restarted.

Because checkpoints are stored in memory 420, such as the DRAM 220 or the L2 cache 422, storing and loading checkpoints is faster relative to prior local checkpoint and recovery approaches that store checkpoints in a file system. Storing checkpoints in memory 420, such as the DRAM 220 or the L2 cache 422, is facilitated by employing the CILP mechanism, described herein, to snapshot microarchitecture state. In addition, local checkpoints are tested during checkpoint recovery to determine whether data included in the checkpoint has an uncorrectable ECC memory error. If the local checkpoint has a memory error, the checkpoint recovery stalls, and a prior local checkpoint is recovered or, alternatively, a global checkpoint is recovered. In this manner, the disclosed techniques also detect memory errors in checkpoints.

Figure 5:
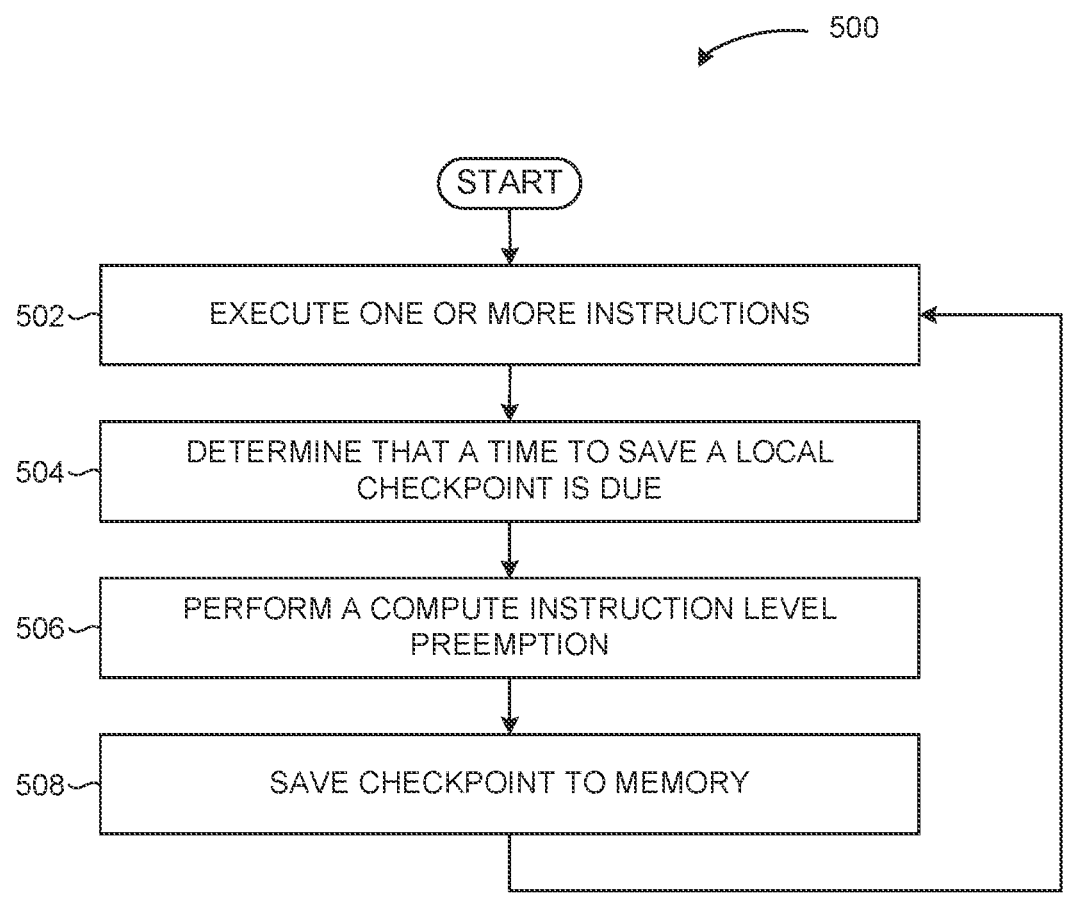
FIG. 5 is a flow diagram of method steps for storing local checkpoints via the PPU of FIG. 2, according to various embodiments.

FIG. 5 is a flow diagram of method steps for storing local checkpoints via the PPU 202 of FIG. 2, according to various embodiments. Although the method steps are described in conjunction with the systems of FIGS. 1-4, persons of ordinary skill in the art will understand that any system configured to perform the method steps, in any order, is within the scope of the present disclosure.

As shown, a method 500 begins at step 502, where a memory client 430 executes one or more instructions. The memory client 430 may be an SM 310, a global constant cache (GCC) 432, a copy engine 434, or a context switcher 436. At step 504, the memory client 430 determines that a time to save a local checkpoint is due. Software executing on the memory client 430 determines that a time to save a local checkpoint is due based on a priori data regarding the frequency of failures of the memory client 430, based on adaptive monitoring of memory errors, based on an elapsed period of time, based on receiving an interrupt, and/or any other technically feasible criteria. In some embodiments, the frequency of storing local checkpoints may change over time.

At step 506, the memory client 430 performs a compute instruction level preemption (CILP) operation. The CILP operation stalls execution of the memory client 430 at an instruction boundary in order to snapshot or capture the microarchitecture context state. The CILP operation preempts the application program, memory copy operation, and/or other operations, referred to herein as "work," executing on any given SM 310. At step 508, the SM 310 stores the microarchitecture context state to local memory, such as the L2 cache 422, at an instruction level granularity. The SM 310 stores the microarchitecture context state in a local checkpoint. As a result, the stored microarchitecture context state becomes a local checkpoint for that particular context. Via the CILP operation, the SM 310 triggers a fine grain checkpoint at any arbitrary interval chosen by the software recovery driver. As a result, a CILP operation may be performed, and a local checkpoint may be saved, on any instruction boundary of an application program or other work executing on the SM 310 or other memory client. The method 500 then proceeds to step 502, described above.

Subsequently, the memory client may receive an indication that data associated with an instruction that includes a memory load operation executed by the memory client is corrupt. In response to receiving the indication, the memory client initiates one or more stall operations for the memory client. The memory client retrieves the microarchitecture context state from the local checkpoint. The memory client sets a current state of the memory client as the microarchitecture context state.

Figure 6:
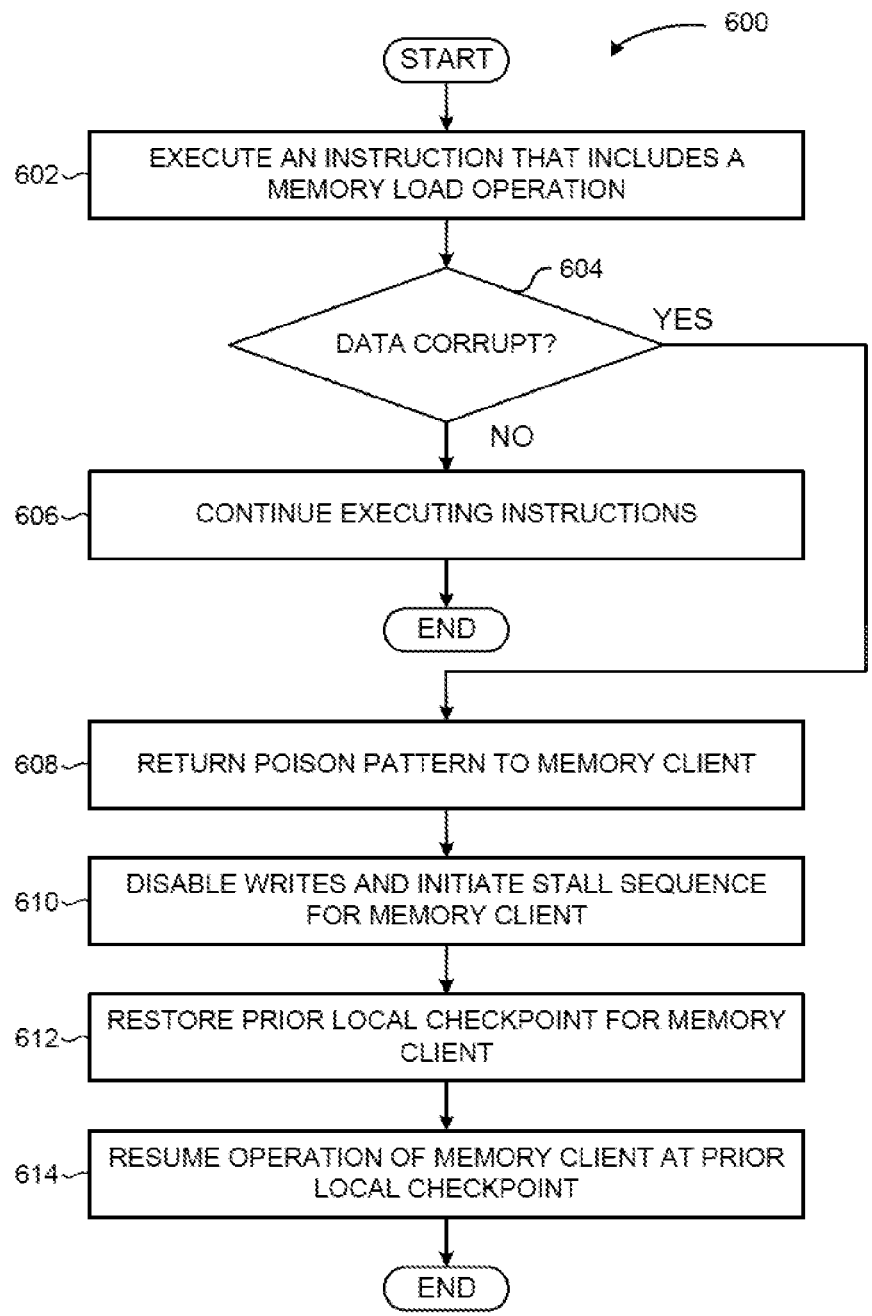
FIG. 6 is a flow diagram of method steps for processing a memory error via the PPU of FIG. 2, according to various embodiments.

FIG. 6 is a flow diagram of method steps for processing a memory error via the PPU 202 of FIG. 2, according to various embodiments. Although the method steps are described in conjunction with the systems of FIGS. 1-4, persons of ordinary skill in the art will understand that any system configured to perform the method steps, in any order, is within the scope of the present disclosure.

As shown, a method 600 begins at step 602, where a memory client 430 executes an instruction that includes a memory load operation. The memory client 430 may be an SM 310, a global constant cache (GCC) 432, a copy engine 434, a context switcher 436, and/or the like. The memory load operation may be directed to data that resides in the DRAM 220, the L2 cache 422, other memory 424, and/or the like.

At step 604, a memory controller logic 405, or other memory controller, that is servicing the memory load operation for the memory client 430 determines whether the data from the memory load operation is corrupt. The memory controller logic 405 determines that the data is corrupt based on one or both of an ECC error or a previously stored poison pattern associated with the data. The poison pattern is a specific bit pattern that the memory controller logic 405 stores into the data poison bits associated with the data. If the data from the memory load operation is not corrupt, then the method proceeds to step 606, where the memory client 430 continues executing instructions. The method 600 then terminates.

Returning to step 604, if the data from the memory load operation is corrupt, then the method 600 proceeds to step 608, where the memory controller logic 405 returns the poison pattern to the memory client 430. At step 610, the memory client 430 disables memory store operations from the memory client 430 and initiates one or more stall operations for the memory client 430. In particular, the memory client 430 disables stores to memory, stores to file systems, and other data transmission from the memory client 430 to prevent the corrupt data from affecting other memory 420 locations, memory clients 430, and/or other components of the PPU 202. The memory client 430 initiates one or more stall operations to disable further memory load operations and/or memory store operations, including memory barriers, and context switches. As part of the stall sequence, the memory client 430 generates and stores error log data that indicates the memory client 430 stalled because of a memory error, the location of the memory error, the instruction executing at the time of the memory error, the context and/or process that was executing on the memory client 430 at the time of the memory error, the memory client 430 that detected the memory error, and/or the like. A software recovery driver resets the engine and analyzes the error log data.

At step 612, the software recovery driver restores the most recent local checkpoint to the memory client 430. Depending on the process and/or context executing at the time of the memory error, the software recovery driver may also restore one or more other memory clients 430 to the most recent local checkpoint. At step 614, the software recovery driver causes the memory client 430 and other affected memory clients 430 to resume operation beginning at the restored checkpoint. The method 600 then terminates.

Figure 7:
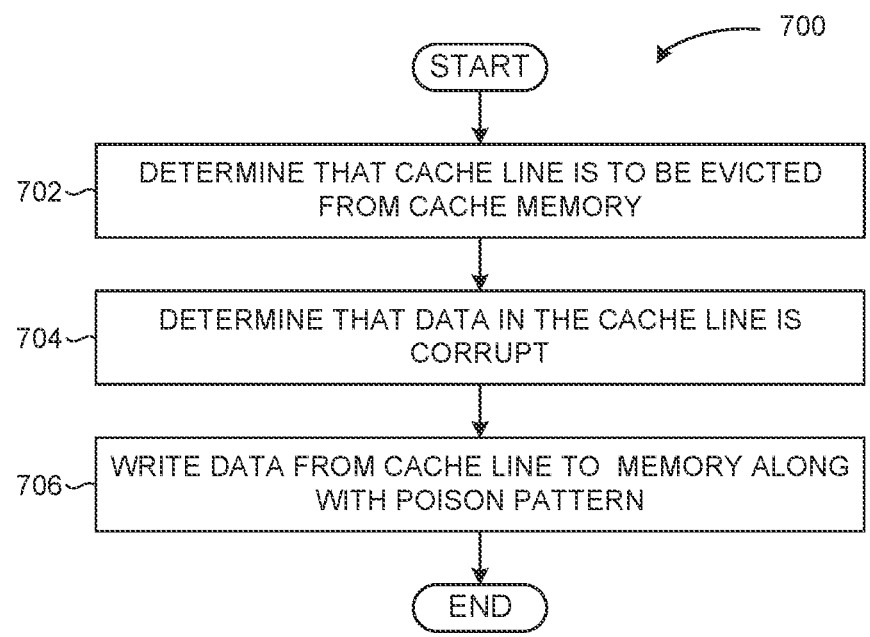
FIG. 7 is a flow diagram of method steps for evicting a cache line that includes a memory error, according to various embodiments.

FIG. 7 is a flow diagram of method steps for evicting a cache line that includes a memory error, according to various embodiments. Although the method steps are described in conjunction with the systems of FIGS. 1-4, persons of ordinary skill in the art will understand that any system configured to perform the method steps, in any order, is within the scope of the present disclosure.

As shown, a method 700 begins at step 702, where memory controller logic 405 associated with a cache memory determines that a cache line is to be evicted from the cache memory. The cache memory may be the L2 cache 422, an L1.5 cache, an L1 cache, and/or the like. At step 704, the memory controller logic 405 determines that the data included in the cache line to be evicted is corrupt. The memory controller logic 405 determines that the data is corrupt based on one or both of an ECC error or a previously stored poison pattern associated with the data. At step 706, the memory controller logic 405 writes data from the cache line to DRAM 220, or other suitable memory, along with a poison pattern that indicates the data in the cache line is corrupt. As a result, when the cache line stored in DRAM 220 is subsequently loaded back into cache memory, the poison pattern identifies the data in the cache line as corrupt based on one previously stored poison pattern associated with the data. The method 700 then terminates.

In sum, various embodiments include a GPU that performs fine-grain local checkpoint and recovery at instruction-level boundaries of memory clients within the GPU. A software driver periodically stores local checkpoints for the memory clients in the GPU. More specifically, a software recovery driver leverages the Compute Instruction Level Preemption (CILP) feature of the GPU to stall execution at a GPU program instruction boundary. When the memory clients within the GPU have stalled, the software recovery driver stores a checkpoint that includes the microarchitecture state of the memory clients. When a memory client detects a memory error, the memory client prevents further data from being stored or transmitted by the memory client to the memory system, thereby preventing the memory error from propagating to other memory clients, to other GPUs, or to the CPU. The memory client also blocks context switches and memory barriers to contain the memory error. The memory client initiates one or more stall operations to drain instructions from any instruction queues in the memory client, in order to flush any pending memory operations. As a result, the memory client preserves the integrity of the previous local checkpoint, thereby enabling the software recovery driver to reliably restart from previous local checkpoint. The memory client stores error log data that includes data associated with the memory error, notifies the software recovery driver and stalls. The software recovery driver than accesses the error log data to determine the nature of the memory error, restores the previous local checkpoint, and restarts the stalled memory client.

At least one technical advantage of the disclosed techniques relative to the prior art is that, with the disclosed techniques, local checkpoint and recovery is performed with finer granularity relative to prior approaches. When a memory client within a GPU detects a memory error, only the affected memory client is halted, the most recent local checkpoint is loaded to the memory client, and the memory client resumes execution from the last local checkpoint. Further, local checkpoint and recovery is performed by the GPU and for each memory client, resulting in faster detection of memory errors that occur during execution of the GPU program. Another technical advantage of the disclosed techniques is that, when a memory client within the GPU detects a memory error, the memory client is prevented from storing or otherwise transmitting data outward to other memory locations, other memory clients in the GPU, other GPUs, or the CPU. As a result, the chance that a memory occurring in one GPU propagates to other parts of the OS node or to other OS nodes is reduced relative to prior approaches. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for processing a memory error, the method comprising:
   causing a first instruction that includes a memory load operation to be executed by a first memory client included in a plurality of memory clients;
   receiving an indication that data associated with the memory load operation is corrupt; and
   in response to receiving the indication:
      disabling the first memory client from performing memory operations directed towards a shared resource, and
      initiating one or more stall operations for the first memory client,
   wherein a second memory client included in the plurality of memory clients continues to execute instructions that perform memory operations directed towards the shared resource while the first memory client is disabled.

2. The computer-implemented method of claim 1, wherein the indication that data associated with the memory load operation is corrupt is based on a bit pattern included in a memory word that includes the data.

3. The computer-implemented method of claim 1, wherein the indication that data associated with the memory load operation is corrupt is based on an error correction code included in a memory word that includes the data.

4. The computer-implemented method of claim 1, wherein initiating the one or more stall operations comprises draining one or more instructions from an instruction queue included in the first memory client.

5. The computer-implemented method of claim 1, wherein initiating the one or more stall operations comprises storing error log data associated with the memory error.

6. The computer-implemented method of claim 5, wherein the error log data identifies one or more of a location of the memory error, the first instruction, a context executing on the first memory client, or the first memory client.

7. The computer-implemented method of claim 1, wherein initiating the one or more stall operations comprises:
   notifying a software driver of the memory error; and
   stalling the first memory client.

8. The computer-implemented method of claim 7, wherein initiating the one or more stall operations comprises restarting the first memory client to execute a second instruction that precedes the first instruction.

9. The computer-implemented method of claim 1, wherein the first instruction stores the data in a constant cache memory.

10. The computer-implemented method of claim 1, wherein the first instruction is included in a block copy operation.

11. The computer-implemented method of claim 1, wherein the first instruction is included in a context swap operation.

12. The computer-implemented method of claim 1, further comprising:
    storing a bit pattern indicating that the data associated with the memory load operation is corrupt;
    loading the data and the bit pattern from a first address; and
    storing the data and the bit pattern at a second address.

13. One or more non-transitory computer-readable media storing program instructions that, when executed by one or more processors, cause the one or more processors to perform steps of:
    causing a first instruction that includes a memory load operation to be executed by a first memory client included in a plurality of memory clients;
    receiving an indication that data associated with the memory load operation is corrupt; and
    in response to receiving the indication:
       disabling the first memory client from performing memory operations directed towards a shared resource, and
       initiating one or more stall operations for the first memory client,
    wherein a second memory client included in the plurality of memory clients continues to execute instructions that perform memory operations directed towards the shared resource while the first memory client is disabled.

14. The one or more non-transitory computer-readable media of claim 13, wherein initiating the one or more stall operations comprises draining one or more instructions from an instruction queue included in the first memory client.

15. The one or more non-transitory computer-readable media of claim 13, wherein initiating the one or more stall operations comprises:
    notifying a software driver of the memory load operation; and
    stalling the first memory client.

16. A system, comprising:
    a memory storing instructions; and
    a processor that is coupled to the memory and, when executing the instructions:
       causes a first instruction that includes a memory load operation to be executed by a first memory client included in a plurality of memory clients;
       receives an indication that data associated with the memory load operation is corrupt; and in response to receiving the indication:
  disables the first memory client from performing memory operations directed towards a shared resource, and
  initiates one or more stall operations for the first memory client,
  wherein a second memory client included in the plurality of memory clients continues to execute instructions that perform memory operations directed towards the shared resource while the first memory client is disabled.

17. A computer-implemented method for processing a memory error, the method comprising:
  determining that a time to save a local checkpoint for a memory client is due;
  stalling execution of the memory client at an instruction boundary of a first instruction included within a kernel or a function of an application program;
  capturing a microarchitecture context state of the memory client; and
  storing the microarchitecture context state in the local checkpoint;
  receiving an indication that data associated with a second instruction that includes a memory load operation executed by the memory client is corrupt; and
  in response to receiving the indication:
    initiating one or more stall operations for the memory client,
    retrieving the microarchitecture context state from the local checkpoint, and
    setting a current state of the memory client as the microarchitecture context state.

18. The computer-implemented method of claim 17, further comprising:
  causing a first instruction that includes a memory load operation to be executed, wherein the memory load operation is associated with a virtual address;
  receiving, via a memory management unit, an indication that a translation lookaside buffer (TLB) entry associated with the virtual address is corrupt;
  updating the TLB entry based on one or more page table entries associated with the virtual address;
  determining that the microarchitecture context state in the local checkpoint does not need to be restored; and
  returning, to the memory client, a physical address associated with the virtual address.

19. The computer-implemented method of claim 18, further comprising:
  causing a first instruction that includes a memory load operation to be executed, wherein the memory load operation is associated with a virtual address;
  receiving, via a memory management unit, an indication that a page table entry associated with the virtual address is corrupt;
  determining that the microarchitecture context state in the local checkpoint does not need to be restored; and
  returning, to the memory client, a negative acknowledgement associated with the virtual address.

* * * * *